United States Patent [19]

King et al.

[11] Patent Number: 5,687,879
[45] Date of Patent: Nov. 18, 1997

[54] DEVICE TO SECURE LID TO BEVERAGE AND FOOD CONTAINERS AND REDUCE SPILLAGE

[75] Inventors: William R. King, Lakewood; Barbara A. Karakusis, Englewood; Liesbeth M. Osa, Littleton, all of Colo.

[73] Assignee: Fit-To-A-Tea, LLC, Littleton, Colo.

[21] Appl. No.: 555,679

[22] Filed: Nov. 13, 1995

[51] Int. Cl.⁶ .................. B67D 1/16; B65D 45/02; E05C 19/18
[52] U.S. Cl. .................. 222/108; 215/392; 220/318; 222/571; 292/258; 292/288
[58] Field of Search .................. 222/108, 571, 222/465.1; 215/41, 392–394; 292/256, 258, 288; 220/315, 318

[56] References Cited

U.S. PATENT DOCUMENTS

| | | | |
|---|---|---|---|
| 1,336,491 | 4/1920 | Stern | 222/465.1 X |
| 1,438,706 | 12/1922 | Hegenberg | 222/108 |
| 1,513,581 | 10/1924 | Caumont | 222/108 |
| 2,506,211 | 5/1950 | Grodde | 222/108 |
| 2,973,217 | 2/1961 | Gregoire | 292/288 |
| 3,124,381 | 3/1964 | Geldart | 292/258 |
| 3,133,665 | 5/1964 | Colhouer | 220/318 |
| 3,174,787 | 3/1965 | Kolman | 292/288 |
| 3,291,515 | 12/1966 | Lierman | 220/318 X |
| 3,363,924 | 1/1968 | Remig | 220/318 X |
| 3,589,760 | 6/1971 | Williams | 292/258 |
| 4,095,830 | 6/1978 | Spellman | 292/288 |
| 4,545,501 | 10/1985 | DeFord | 220/318 |

FOREIGN PATENT DOCUMENTS

| | | | |
|---|---|---|---|
| 548500 | 1/1923 | France | 222/108 |
| 1065185 | 5/1954 | France | 222/571 |
| 257161 | 2/1913 | Germany | 222/108 |
| 74747 | 7/1932 | Sweden | 222/108 |
| 559138 | 2/1975 | Switzerland | 220/318 |

*Primary Examiner*—Kevin P. Shaver
*Attorney, Agent, or Firm*—Davis, Graham & Stubbs LLP

[57] ABSTRACT

A method and device are provided to secure a lid to a teapot or other food and beverage container and to prevent dripping therefrom. The device for use with a teapot includes a loop of elastic cord, with a hook and a sponge attached to the cord. The sponge is positioned under the spout of the teapot so that it will absorb drips from the spout. The loop is stretched over the lid of the teapot and the hook is attached to the teapot handle. Two sliding retainers are located around the loop between the sponge and the hook, and may be positioned around a knob on the top of the lid. Sliding the retainers adjusts the tension on the loop. The retainers are decorative, and may also be adorned with standard button covers. Different food and beverage containers may require modifications, such as using a cord with two hooks instead of a hook and a sponge.

8 Claims, 2 Drawing Sheets

DEVICE TO SECURE LID TO BEVERAGE AND FOOD CONTAINERS AND REDUCE SPILLAGE

FIELD OF THE INVENTION

The preset invention relates to the field of food and beverage containers, and more specifically to a device that secures a lid to a teapot and reduces spillage when the tea is poured, and, in an alternate embodiment, secures a casserole lid to a casserole.

BACKGROUND OF THE INVENTION

Tea has been enjoyed as a beverage by many cultures since time immemorial. Traditionally, "tea" has referred specifically to the beverage resulting from infusing hot water over leaves from the tea plant. Now, the word "tea" is also used to describe similarly infused beverages arising from the use of many other plants and combinations of several plants. While traditional tea remains very popular, these new "herbal" teas have greatly increased the overall consumption of tea beverages.

Several methods are commonly used to brew tea. The most traditional method is to add leaves into a teapot, pour hot water into the teapot so as to cover the leaves, and allow the leaves to brew for a desired period of time, generally about five minutes. Tea may also be brewed directly in a cup, such as through the use of a tea bag or a tea ball. Instant tea allows tea to be made by adding water to a processed powder and stirring the mixture, and thus eliminates the brewing step.

Despite the alternative tea-making methods, connoisseurs generally regard teapot brewing as producing the finest beverage. The teapot contains most of the steam and water vapor created during the brewing process within the teapot, and thus creates a stronger aroma and a richer brew than tea brewed in an open cup. Teapots also allow for several cups of tea to be brewed simultaneously, and hence are commonly used in social situations. Instant tea is considered to be far inferior to tea brewed by any method, and is only used because of its convenience.

The basic teapot design is well known and has not changed for hundreds of years. A teapot, usually ceramic, has a spout emanating from its side and a handle located on the side opposite the spout. The top of the teapot has an opening, through which the tea and the water are introduced into the teapot. A lid is placed over the opening to prevent steam from escaping and to keep the brewed tea warm. After the tea has brewed a desired length of time, the tea is poured through the spout into a cup or cups.

While the above described teapot is very effective for brewing tea, as proven by its long history of use, it is not without problems. Two problems, in particular, have plagued generations of tea drinkers. The first problem is that the lid may fall off the pot when the tea is poured. This may result in the lid breaking and the tea, which is usually scalding hot, pouring uncontrolled from the opening in the top of the teapot as well as from the spout. As well as the damage to the lid, the loss of the tea, and the potential burn danger, the tea usually stains any fabric that it contacts. Tea stains may be difficult, or even impossible, to fully remove.

The second problem commonly associated with teapots is that tea often drips from the spout at the end of the pouring phase. The teapot is tilted to pour the tea, and is leveled after the desired amount of tea has been poured. During this leveling, the fluid stream of tea ends, and the last amount of tea in the stream adheres to the underside of the spout, and eventually drips off the spout. Instead of ending up in a teacup, these drips of tea roll down the teapot and either stain the teapot or fall onto whatever surface happens to support the teapot. This may be a nonporous tray or a counter, allowing the tea server to clean up the drops with only a measure of inconvenience. Or, the drops may collect on a fabric surface such as a tablecloth or a carpet, with the attendant problems of removing the stain.

Thus, there exists a need for a device to prevent the lid from falling off a teapot, and to prevent the teapot from dripping. Since tea is often consumed is a social context, it is desirable that such a device be aesthetically pleasing and decorative. As lids also have a tendency to fall off other food and beverage containers, it would also be useful to have a device to secure lids to containers other than teapots.

SUMMARY OF THE INVENTION

The present invention includes a loop of elastomeric material. A hook is attached to the loop, and a sponge is attached to the loop opposite the hook. The device is attached to a teapot by placing the hook around the handle of the teapot, and placing the sponge around the spout of the teapot. The loop then runs over the lid of the teapot. The lid of the teapot contains a knob or similar protrusion that allows the teapot user to remove the lid from the teapot. The loop is positioned so that one strand of the loop runs on each side of the knob.

The length of the loop is such that it must be stretched to reach from the handle of the teapot to the spout, and the loop is thus under tension. The loop secures the lid to the teapot, because the lid cannot easily be removed without displacing the loop. Since the loop is snugly tensioned over the pot, this will not occur and the lid will remain on the teapot, even when the teapot is tilted at extreme angles from its rest position.

The sponge attached to the spout collects any drips from the spout. The sponge is positioned on the spout below the spout opening, so that the sponge does not interfere with the normal tea pouring. However, the sponge is located on the portion of the spout from which drops run down. Instead of running down the spout and eventually falling off it, the drops will be absorbed into the sponge.

Two slidable retainers, such as shank buttons, are placed around the loop between the hook and the sponge. The loop material passes through an opening (the shank) in each retainer, and the retainers may be positioned anywhere on the loop between the hook and the sponge. The retainers serve several functions. They may be positioned close to the lid knob, one on the side facing the hook and the other on the side facing the spout. This insures that one strand of the loop will remain on each side of knob, and the loop will remain essentially centered over the lid. The retainers also allow for the loop tension to be controlled. Each retainer forces the two strands of the loop together where the loop passes through the retainer. The strands separate away from each other to pass around the lid knob and the spout. The retainers thus form approximately triangular loops sections, with a vertex at each retainer. Changing the position of the retainers changes the length of the triangles, and the loop material is stretched to a greater or lesser degree (and thus under more or less tension) depending on the retainer portion.

The retainers also serve a decorative function. The retainers may be intrinsically decorative, as by having button portions formed of engraved metal. Also, the button portions may be sized to receive standard button covers, and thus may incorporate the plethora of fancy button covers into the present invention. A typical button cover has a decorative element, such as a flower, adhesively attached to a covering portion that is removably attachable to a button, such as may be found on the retainers of the present invention.

The sponge is replaceable, so that a stained sponge can be discarded. This may be accomplished by a clasp that joins the elastic cord into a loop. Unclasping the loop allows the sponge so be slid off the cord, and a new sponge to be installed.

Alternate embodiments of the invention are useful to secure lids to food containers such as casseroles. Depending on the type of lid, the invention may attach thereto by two hooks attached to elastic cord, or by looping the cord directly over the handle. In either case, the invention will still include slidable retainers and a decorative quality.

DETAILED DISCLOSURE OF THE INVENTION

Figure 1:
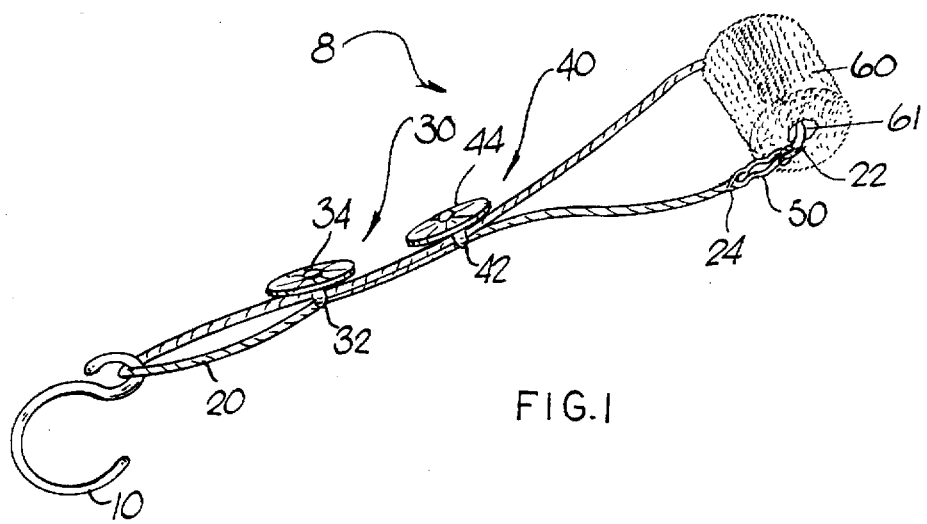
FIG. 1 is a diagrammatic view of the present invention, with the sponge shown in phantom.

Referring to FIG. 1, a device 8 embodying the present invention includes a hook 10, a segment of elastomeric cord 20, two retainers 30, 40, a clasp 50, and a sponge 60. The cord 20 is attached to the hook 10, by looping the cord 20 around a bend in the hook 10. The cord 20 passes through a retainer 30, the retainer 30 having a ring portion 32 through which the cord 20 passes and a button portion 34 attached to the ring portion. The button portion 34 need not be a functional button, but is merely button or disc shaped. The cord 20 continues and passes through a retainer 40 that is substantially the same as retainer 30. The cord 20 continues until it terminates at two ends 22, 24, each end point 22, 24 being knotted. The ends 22, 24 each pass through a clasp 50, so that the cord 20 is effectively a closed loop while the clasp 50 is closed. A sponge 60 surrounds the clasp 50, the two ends 22, 24 of the cord 20, and a portion of the cord 20 that extends away from the ends 22, 24. Thus two strands are formed in the cord 20 that run from the hook 10 to the sponge 60.

Figure 2:
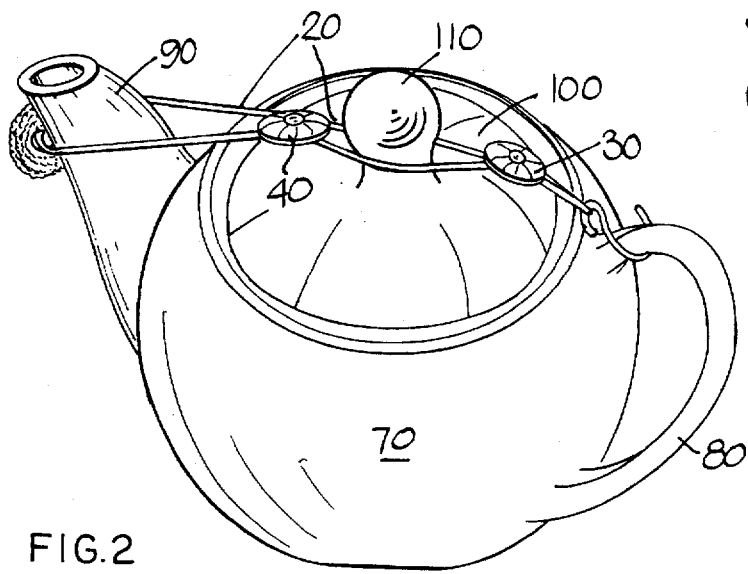
FIG. 2 is a perspective view of the present invention situated on a teapot.

Referring now to FIG. 2, the invention is shown attached to a teapot 70. The teapot 70 has a handle 80 which a user grasps to move the teapot and to pour tea out of a spout 90 that emanates from the teapot 70 opposite the handle 80. A lid 100 is located on the top of the teapot 70, in between the handle 80 and the spout 90. The lid 100 has a knob 110 located in its center, so that the teapot user may easily place and remove the lid 100.

To brew tea, the lid 100 is removed and tea and hot water are placed into the pot 70, and the lid 100 is then replaced onto the teapot 70 while the tea brews. At this time, the device 8 is positioned onto the teapot 70. The sponge 60 is placed onto the under side of the spout 90 (see also FIG. 4). The cord 20 is then pulled across the teapot 70, specifically the lid 100, until it is possible to place the hook 10 around the teapot handle 80, and the hook 10 is so placed. The hook 10 is made of, or coated with, a material such as vinyl or plastic that is unlikely to chip or otherwise mar the teapot 70. The length of the cord 20 is such that it will not be possible to extend the cord 20 from the spout 90 to the handle 20 without stretching the cord 20, and thus it is under elastic tension. The retainers 30, 40 are then positioned so that retainer 30 is between the handle 80 and the knob 110, and the retainer 40 is between the knob 110 and the spout 90. Tea is then ready to be poured from the teapot 70.

It should be apparent that the device 8 in the above described position secures the lid 100 onto the teapot 70. For the lid 100 to fall off the teapot 70, the cord 20 would have to be displaced away from its position covering the lid 100. However, the elastic quality of the cord 20 prevents this from occurring. Since the cord 20 is stretched, the tension from the cord 20 pulls the hook 10 into the handle 80 and the sponge 60 into the spout 90. The weight of the lid 100 is insufficient to significantly move the cord 20 from its position, and the lid 100 will not fall off the teapot 70.

The retainers 30, 40 take advantage of the knob 110 to further secure the lid 100 to the teapot 70. The ring 32 is sufficiently small so that the two strands of the cord 20 contact each other in the ring 32. The strands then separate to pass around the knob 110, and again come together to pass through the ring 42. The retainers 30, 40 may be positioned close to the knob 110 to increase the tension on the cord 20, since the strands of the cord 20 will rapidly converge (at the ring 32), separate (at the knob 110), and reconverge (at the ring 42). Without the retainers 30, 40, the cord 20 strands would make a gradual curve from the hook 10, around the knob 110, and to the sponge 60.

Figure 3:
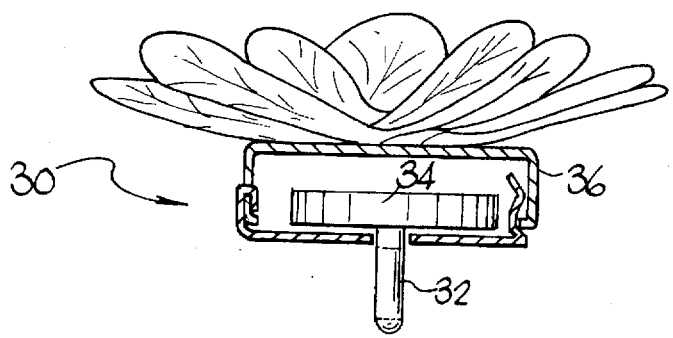
FIG. 3 is a side sectional view of a slidable retainer of the present invention, covered by a button cover.

The retainers 30, 40 serve the ancillary function of decorating the teapot. The retainers are shank buttons, with the ring portions 32, 42 corresponding to the shank and the button portions corresponding to the button. When shank buttons are used, in particular, the button portions 34, 44 of the retainers 30, 40 may be intrinsically ornamental by being made of material such as polished, engraved brass or faux brass. In one embodiment of the invention, the button portions 34, 44 are sized to accept standard sized button covers, such as button cover 36, that are commonly used to cover shank buttons and decorate articles of clothing (see FIG. 3). The button cover 36 may have an ornament, such as an artificial flower, adhesively attached thereto. Another embodiment of the invention uses somewhat larger retainers that do not accept standard button covers, but are still intrinsically ornamental. These larger retainers may be easier to properly position.

Figure 4:
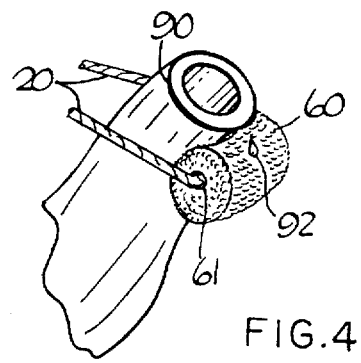
FIG. 4 is a detailed side view of the sponge section of the present invention situated on a teapot.

The sponge 60 serves as a drip collector as well as anchoring the cord 20 to the spout 90. When a teapot is used without the device 8, it is very common for droplets of tea to adhere to the spout 90 and run down its exterior, eventually dripping off the teapot 70 altogether. It is also common for a residue of tea to fall directly out of the spout 90 after tea has been poured into a cup (or other desired container) and to land outside of the cup, at the end of the tea pouring phase when the teapot is tilted back to its resting position. Referring to FIG. 4, the sponge 60 collects tea that would otherwise spill by blocking the path of the tea. The sponge 60 is absorbent, so the tea is collected into the sponge 60. The sponge 60 extends beyond the lip of the spout 90, so that a drip falling directly below the spout 90 will fall into the sponge 60.

The sponge 60 will not interfere with the normal pouring of tea from the spout 90, because the primary tea flow will be out of and away from the spout 90. It is only the last amount of tea, that does not receive pressure from any tea behind it, that falls directly down from the spout 90 instead of down and away from the spout. It is this last amount of tea that the sponge 60 collects.

Since the sponge 60 collects tea and will eventually become stained, it may be desirable after a period of use to replace the sponge 60. Referring to FIG. 1, a clasp 50 secures the cord 20 in a continuous loop. The cord has two ends 22, 24 formed into knots that ordinarily prevent the ends from sliding through the clasp 50. The clasp 50 may be opened to allow the ends 22, 24 to be removed from the clasp 50, so that the cord 20 in no longer in a loop. This allows the sponge 60 to be slid off the cord 20, and a new sponge may then be placed onto the cord 20. The cord ends 22, 24 may then be refastened to the clasp 50, and the device 8 will again be ready for use.

The sponge 60 contains a hole 61 through which the cord 20 passes, including the cord ends 22, 24 and the clasp 50. To manipulate the clasp 50 to replace the sponge 60, the cord 20 is slid through the sponge hole 61 until the clasp 50 is positioned outside of the sponge 60, as shown in FIG. 1. After a new sponge is placed onto the cord 20 and the clasp 50 is fastened, the clasp 50 may be slid into the sponge hole 61.

Although the sponge could be replaced each time that it is used, that may be unduly burdensome. Instead, the sponge 60 may be cleaned by rinsing it with water. A dark colored sponge 60, such as charcoal or dark blue or dark green, may be used to minimize the visibility of stains.

The sponge 60 works best to collect tea drops when it is moistened before use. Often, liquid will bead and roll off a dry sponge without being absorbed. If the sponge is moistened before use, however, the sponge 60 will absorb the liquid.

While a preferred embodiment of the invention has been described, it should be apparent that many modifications could be made thereto without substantially altering the invention's basic functioning. For example, the preferred tea collecting unit has been described as a sponge. However, other types of absorbent material, such as cotton fabric, could be used with similar results. As a second example, the cord 20 is described as being a segment of cord that is joined by the clasp 50. An alternate construction would be to use a single loop of cord, and to form the sponge to be connected onto the cord, such as with a Velcro fastener. As a third example, a single strap of material could be used to connect the spout 90 to the handle 10 of the teapot 70, instead of the looped cord 20. Also, while the invention has been described as being used with a teapot 70, it should be apparent that the device 8 can be used with similar containers, such as coffeepots.

Figure 5:
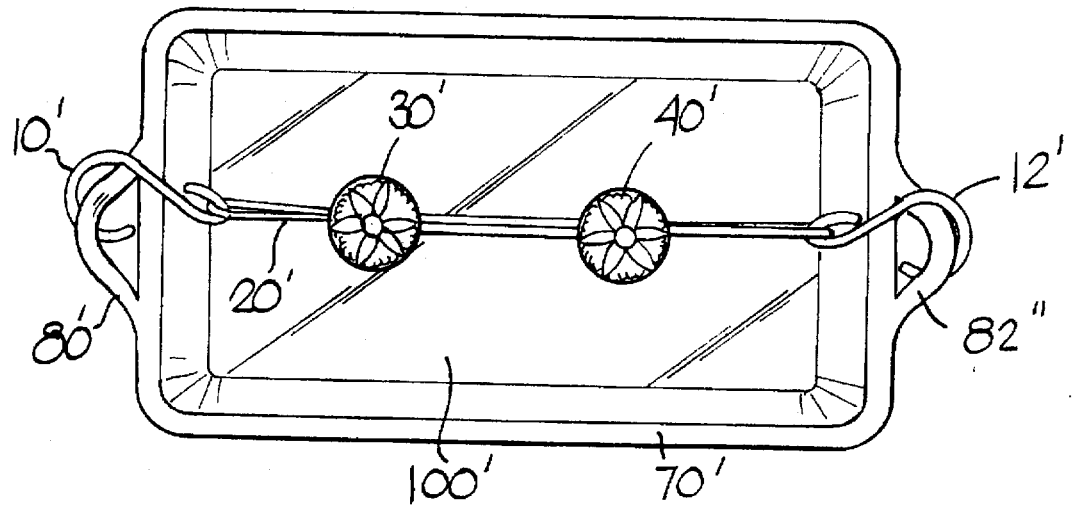
FIGS. 5 and 5A are plan views of alternate embodiments of the present invention attached to a food containers such as a casserole.

Alternative embodiments of the invention are useful to secure a lid to a food containers such as a chocolate pots and casseroles. The invention may take several embodiments depending on the type of container. Referring to FIG. 5, an embodiment of the invention is shown securing a lid 100' to a casserole 70', the casserole 70' having two handles 80', 82' at opposite sides. The handles 80', 82' form apertures with the casserole 70' so that a user may lift the casserole 70' by grasping the handles. This embodiment of the invention is similar to the embodiment of the invention used to secure a teapot lid, including an elastic cord 20' stretched over casserole 70'. However, two hooks 10', 12' on opposite sides of the loop 20' are used to secure the lid to the handles 80', 82'.

Figure 5A:
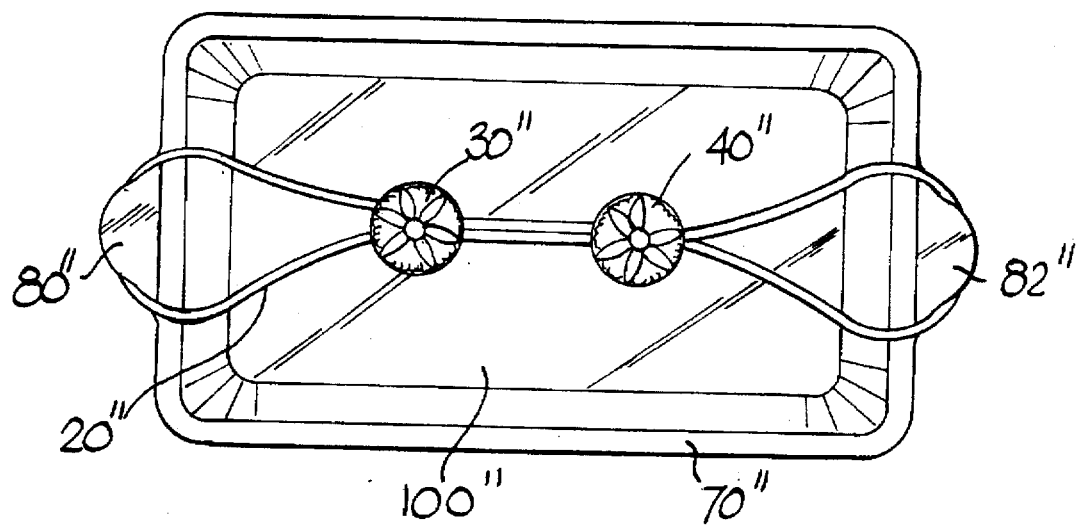

Referring to FIG. 5A, a second alternative embodiment is useful to secure a lid 100" to a casserole 70" having handles 80", 82" that are not apertured. The handles 80", 82" are used by placing a pot holder (or a user's hands) directly under the handles 80", 82" and lifting. An embodiment of the present invention useful to secure a lid to this type of casserole does not include any hooks or supplemental attaching units; instead, a portion of a cord 20" is looped around each of the handles 80", 82". In the embodiments shown in FIGS. 5 and 5A, retainers 30', 40' or 30", 40" are used similarly to the above-described retainers 30', 40', and allow a lid to be snugly tensioned onto a container as well as providing ornamentation.

What is claimed is:

1. A device to secure a lid to a pot having a handle on one side and a spout on the opposite side and to prevent dripping therefrom, the device comprising:

an elastic cord formed into a loop, a hook attached to a first end of the loop, and a sponge attached to a second end of the loop opposite the first end; the loop being dimensioned so that it can be stretched over the lid when the hook is hooked to the handle and the sponge is placed over the spout;

a first retainer having a ring and a button attached to the ring, the loop running through the ring of the first retainer; a second retainer having a ring and a button attached to the ring, the loop running through the ring of the second retainer, both retainers being positioned on the loop between the portion of the loop atttached to the handle and the portion of the loop attached to the spout; and a button cover, the button cover being removably attached to the first retainer button.

2. The device of claim 1, wherein the hook is metal with a soft coating.

3. The device of claim 1 further comprising: a clasp attaching opposite ends of the cord together to form a loop.

4. The device of claim 1, wherein the sponge has a hole therethrough, the clasp being positioned in the hole.

5. A method of securing a lid to a teapot having a handle and a spout comprising:

placing an elastic loop of material around the spout of the teapot;

stretching the loop over the lid towards the handle of the teapot:

attaching the loop to the handle by placing a hook attached to the loop around the handle;

positioning two retainers through which the loop is passed, whereby one of the retainers is placed between the knob and the teapot handle and another of the retainers is placed between the knob and the teapot spout; and placing a decorative button cover around at least one of the retainers.

6. The method of claim 5, further comprising the step of: removing a portion of the loop that passes through a sponge from the sponge and passing a portion of the loop through a replacement sponge.

7. A device to secure a lid to a food container having a first handle on a first side and a second handle on a second side opposite the first side, each handle forming an aperture between the handle and the container, the device comprising:

an elastic cord formed into a loop;

a first hook attached to a first end of the loop:

a second hook attached to a second end of the loop; the loop being dimensioned to that it can be stretched over the lid when the first hook is hooked to the first handle and the second hook is hooked to the second handle;

a first retainer having a ring with a button attached, the loop running through the ring of the first retainer; and a second retainer having a ring with a button attached, the loop running through the the ring of the second retainer;

wherein the buttons are sized to receive button covers.

8. A device to secure a lid to a food container having a first handle on a first side and a second handle on a second side opposite the first side, each handle being a continuous projection from the container, the device comprising:

an elastic cord formed into a loop;

the loop being dimensioned so that it can be stretched over the lid when a first portion of the loop is looped around the first handle and a second portion of the loop is looped around the second handle;

a first retainer having a ring, the loop running through the ring of the first retainer;

a second retainer having a ring, the loop running through the ring of the second retainer; and wherein the first retainer has a button attached to the ring of the first retainer, and the second retainer has a button attached to the ring of the second retainer;

wherein the buttons are sized to receive button covers.

* * * * *